United States Patent [19]
Hawkes

[11] Patent Number: 5,743,411
[45] Date of Patent: Apr. 28, 1998

[54] OPEN FRAME, SELF STANDING BICYCLE PARKING MODULE

[75] Inventor: E. Gerry Hawkes, Woodstock, Vt.

[73] Assignee: Bike Track, Inc., Woodstock, Vt.

[21] Appl. No.: 418,626

[22] Filed: Apr. 7, 1995

[51] Int. Cl.$^6$ ............................................. A47F 7/04
[52] U.S. Cl. .................... 211/20; 211/5; 211/22; 211/21; 211/19; 70/235
[58] Field of Search ................. 211/5, 19, 20, 211/22; 70/234, 235, 228, 233

[56] References Cited

U.S. PATENT DOCUMENTS

| | | | |
|---|---|---|---|
| 557,470 | 3/1896 | Young | 211/20 |
| 585,739 | 7/1897 | Brundage | 211/20 |
| 1,314,625 | 9/1919 | Wedin | |
| 3,529,729 | 9/1970 | Gaye | 211/20 |
| 4,015,718 | 4/1977 | Bernard | 211/5 |
| 4,033,459 | 7/1977 | Zach | 211/20 |
| 4,047,614 | 9/1977 | Rodek | 211/20 |
| 4,325,484 | 4/1982 | Berry | |
| 4,352,432 | 10/1982 | Smith | |
| 4,465,196 | 8/1984 | Erb | |
| 5,096,068 | 3/1992 | Thériault | 211/20 X |
| 5,098,155 | 3/1992 | Graber | 211/20 X |
| 5,301,817 | 4/1994 | Merritt | 211/20 X |

FOREIGN PATENT DOCUMENTS

| | | | |
|---|---|---|---|
| 0679567 | 11/1995 | European Pat. Off. | |
| 840200 | 7/1949 | Germany | 211/20 |
| 9212054 | 9/1993 | Germany | |
| 456677 | 11/1936 | United Kingdom | 211/22 |
| 867753 | 5/1961 | United Kingdom | 211/19 |
| WO 9503731 | 2/1995 | WIPO | |

OTHER PUBLICATIONS

"Hex Rack for Bikes", *Mechanix Illustrated* p. 26.

*Primary Examiner*—Wynn E. Wood
*Assistant Examiner*—W. Glenn Edwards
*Attorney, Agent, or Firm*—Sughrue, Mion, Zinn, Macpeak & Seas

[57] ABSTRACT

Upstanding, vertical side rails welded to oppositely facing horizontal top and bottom plates at respective corners thereof form a unitary, rigid, parallelepiped open frame structure including an open front slot to receive a bicycle wheel rim and tire. Deflectable resilient members mounted to side rails extend towards each other and snap behind an inserted bicycle wheel rim. Horizontal side rails or plates and rear plates are fixed to respective pairs of side rails to render the structure rigid. Apertures in the bottom and top plates permit fixedly mounting of the module or a plurality of upright modules to form a multi-module bicycle rack. A transverse common coupling member may be a bench, a planar seat, a table top or a planter. A steel security arm having a U-shaped steel loop welded at one end may be rotatably mounted to the open frame structure at the opposite end.

18 Claims, 4 Drawing Sheets

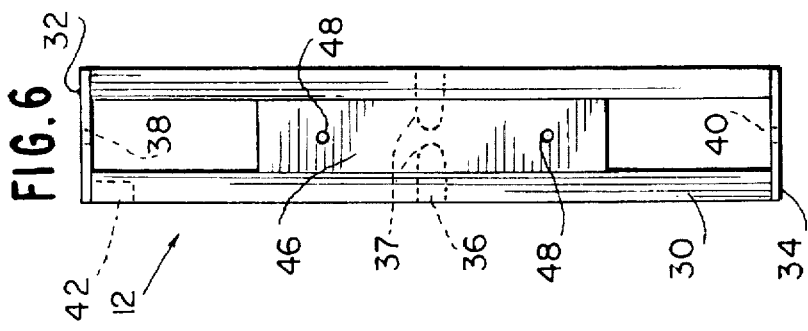
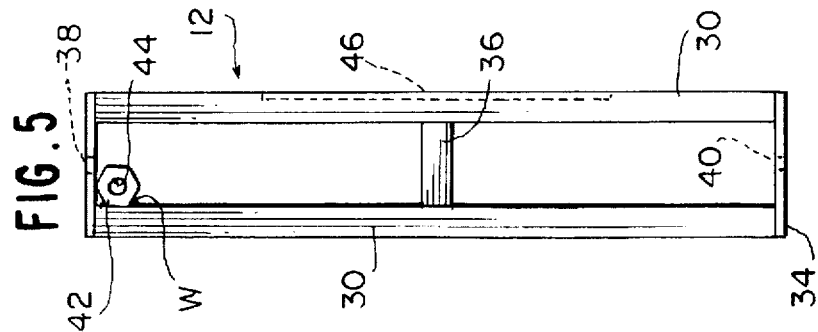
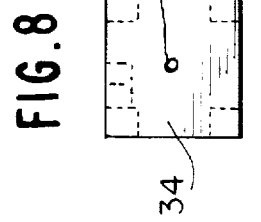
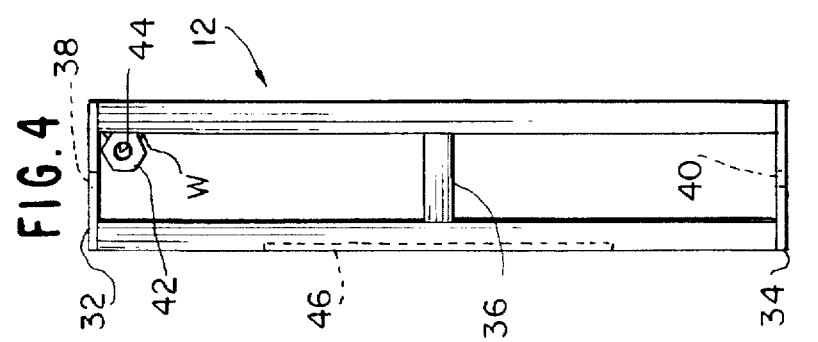
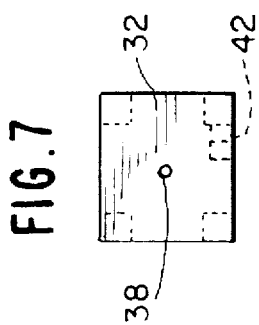
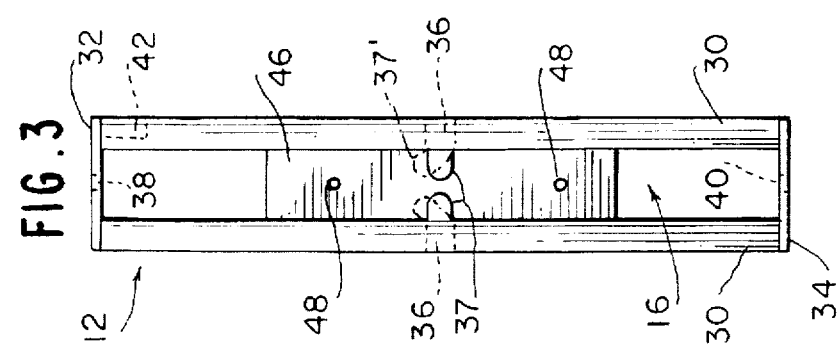

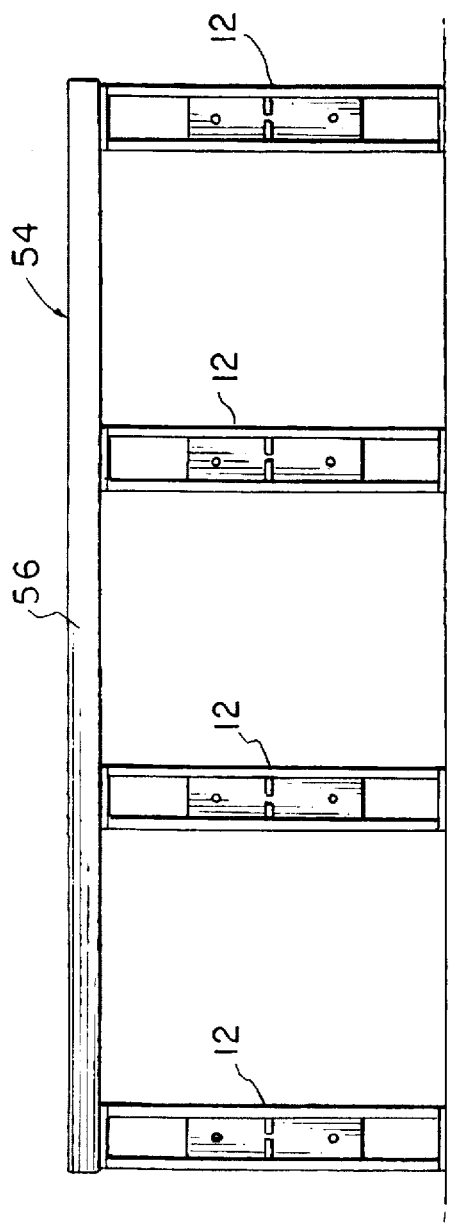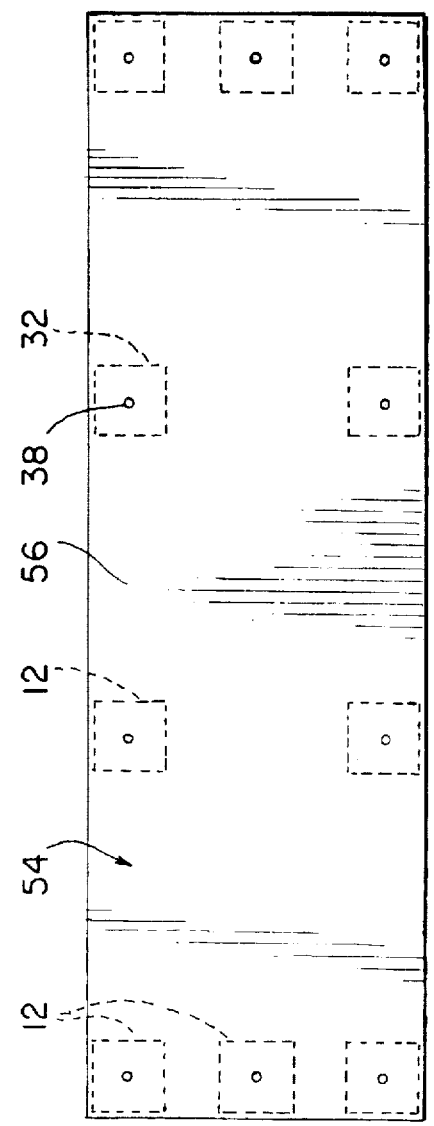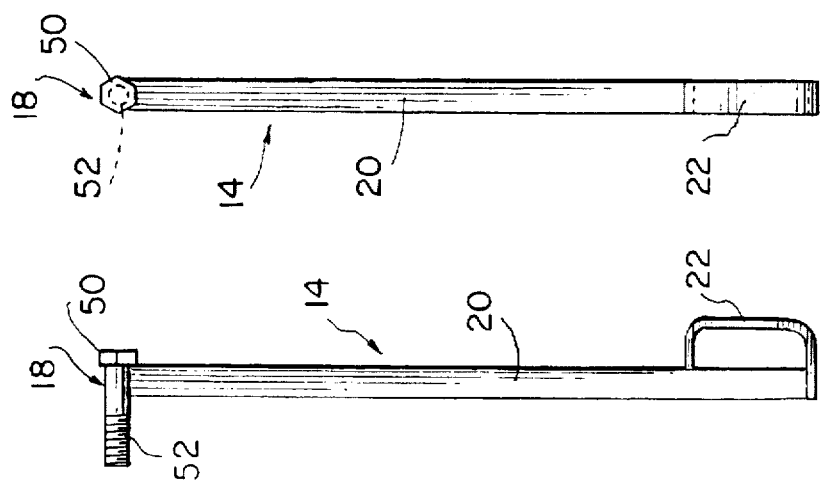

OPEN FRAME, SELF STANDING BICYCLE PARKING MODULE

FIELD OF THE INVENTION

This invention relates to bicycle parking stands and racks, and more particularly to a rigid, open frame, self standing bicycle parking module and to a multi-modular unit bicycle rack utilizing a series of such modules.

BACKGROUND OF THE INVENTION

Locally and worldwide, human and ecosystem health is being adversely affected by automobile related pollution and land use. In spite of this, only a tiny fraction of the almost 150 million adult bicycles purchased in the United States over the last 25 years are used on a regular basis. A main reason why bicycles are not used more frequently lies in a lack of convenient, secure parking. Conventional bicycle parking racks require too much space and are too unattractive to be placed conveniently and in adequate numbers. As traffic congestion worsens and locations for new roads and parking become more difficult to find, convenient cycling will become more and more important. Bicycles are seldom impeded by traffic jams and when convenient parking devices are provided, bicycles may be parked at the final destination.

Known bicycle storage racks and article suspension devices in general have utilized the concept of an open slot within which is positioned the article to be suspended or held, while utilizing the element forming such slot or auxiliary devices to maintain a bicycle wheel or like element maintained within such slot.

U.S. Pat. No. 4,352,432 issued Oct. 5, 1982 to Terrance R. Smith and entitled "BICYCLE STORAGE RACK" is exemplary of a bicycle storage rack which stores bicycles in a vertical position and within a plurality of U-channels which may be mounted to a vertical wall and open outwardly therefrom. The U-channel walls are slightly distensible so as to releasably restrain the front or both wheels of a vertically oriented bicycle by engagement with the lateral surface of the rim. Such storage racks are unsightly, occupy considerable space require adjustment to various size bicycles, and lack security devices for maintaining the bicycle coupled to the rack.

U.S. Pat. No. 4,465,196 issued Aug. 14, 1984 to Richard I. Erb and entitled "BICYCLE RACK" teaches a simplified bent wire bicycle rack providing a three-point support for a bicycle wheel, with the rack vertically mounted and adapted to restrain a front or rear wheel of a bicycle, with the bicycle oriented either horizontally or vertically. The wire bicycle rack forms spaced apart pairs of outwardly diverging, inwardly converging tire wedging members which frictionally grip the opposite sides of the balloon tire as it is mounted on the wheel rim. Such wire frame bicycle racks offer low security hitching points for a cyclist supplied cable, are subject to being bent and distorted by misuse or vandals and are not effectively used with a U-lock normally employed in locking a bicycle frame to a fixed securing point as for instance a fence, rigid post or rigid bicycle rack.

U.S. Pat. No. 1,314,625 issued Sep. 2, 1919 to G. A. Wedin entitled "HOLDER FOR TOWELS AND THE LIKE" and U.S. Pat. No. 4,325,484 issued Apr. 20, 1982 to Richard M. Berry and entitled "HOLDER FOR ELONGATED ARTICLES" teach rigid frame structures having side-by-side members defining a slot between which extends from opposite sides bristles acting to support respectively a towel or like structure and a broom handle permitting the suspension of such articles after insertion within the slot. Such devices maintain the position of the supported or suspended article by friction and do not provide adequate restraints for a bicycle wheel or the complete bicycle when slot positioned therein.

It is therefore a primary object of the invention to provide an open frame, self standing bicycle parking module and a multi-modular unit comprised of a plurality of such upstanding open frame parking modules which provide convenient, unobtrusive bicycle parking with minimum visual impact which provides built-in security for locking of the vehicle to the bicycle parking module or a rack, wherein plural modules of such racks act to support transverse seats, benches or planters, which modules may be flush mounted to a vertical wall, post or the like and constitute an array of the same about the periphery of a common transverse member supported thereby.

SUMMARY OF THE INVENTION

The invention is directed in part to an open frame, self standing bicycle parking module comprised of opposed rectangular top and bottom plates, vertical side rails fixed at opposite ends to facing surfaces of top and bottom plates at respective corners and forming a unitary, parallelepiped, rigid open frame structure defining an open front slot sized to receive a bicycle wheel rim and tire. A rear plate may be fixedly mounted to and spanning between a pair of opposed side rails to the rear of the open front slot with apertures therein to permit mounting of the bicycle parking module to a vertical wall or like support structure. A pair of side rails may be provided intermediate of the top and bottom plates, fixed at opposite ends to front and rear side rails to each side of the structure to create a slot effect for the wheel, to provide a preferred mounting point for the flexible wheel retaining fingers, and to ensure rigidity and strength to the module. Apertures may be provided in the bottom and top plates to fixedly support the bottom plate as a base on an underlying planar support member or surface and to permit coupling of the top plate to a common transverse coupling member such as a seat, bench or planter.

A module can be made with solid sides and back that functions like the open frame module. If one were to mold a composite module the sides and back would be closed for strength and moldability.

The invention is additionally directed to a multi-modular unit bicycle rack comprised of a plurality of such upstanding open frame bicycle parking modules which are spaced from each other and are coupled via apertured top plates and/or via apertured rear plates thereof to transverse common coupling member(s) overlying or attached to the rear of the plurality of upstanding modules. Such open frame, self standing bicycle parking modules may form a spaced array about the periphery of the common transverse coupling member(s) which may be of circular plan form, rectangular form, polygonal form, or may constitute itself an open frame linear or non-linear structure. Such common coupling member(s) may be of circular loop form, coupled at circumferentially spaced locations to a top plate or rear plate of each bicycle parking module. Preferably, resilient rubber retaining fingers project outwardly from the side rails at the entrance of the vertical slot which are deflectable to permit the entry of the bicycle wheel tire and rim and to lock the wheel within the module. An aperture within the bottom plate permits the open frame bicycle parking module to be fixedly mounted to an underlying planar support member or surface so as to maintain the open frame in fixed position and in vertical upright position. The rubber fingers flex forward and backward to permit easy insertion and removal of the bicycle rim and tire within the module front slot. The clean open rectangular frame design and rugged steel construction makes the module attractive, functional, endurable, and easy to ship and store. With the security arm and the bumper bolt (new) packaged between the module rails, 200 modules can be shipped or stored in a space 4'×4'×4'. Preferably, each module is fitted with an optional, high strength pivotable security arm having a headed threaded bolt or stud welded to one end and a U-shaped handle welded to the opposite end and projecting outwardly therefrom. By rotating the arm 360°, the headed bolt or stud is threaded into a nut, which in turn is welded to a side of one of the side rails and to the underside of the top plate. The length of the rotatable security arm is slightly less than the height of the side rails. Once the security arm is threaded into place and the module is installed, the arm can no longer be rotated 360° and thus can not be removed. In addition, a bumper bolt threaded into place after the arm also prevents 360° rotation. A bicycle may be secured with a U-lock which passes through the handle like steel loop at the free end of the pivotable security arm, with the U-lock enveloping one of the bicycle frame members and a wheel.

BRIEF DESCRIPTION OF THE DRAWINGS

FIG. 3 is a front elevational view of the open frame, self standing bicycle parking module of FIGS. 1 and 2, with the high strength security arm removed therefrom.

FIG. 4 is a left side elevational view thereof.

FIG. 5 is a right side elevational view thereof.

FIG. 6 is a rear elevational view thereof.

FIG. 7 is a top plan view thereof.

FIG. 8 is a bottom plan view thereof.

FIG. 9 is a front elevational view of the security arm of the bicycle parking module of FIGS. 1 and 2.

FIG. 10 is a right side elevational view thereof.

FIG. 11 is a front elevational view of a multi-purpose bench style bicycle parking rack and seat structure forming a further embodiment of the invention.

FIG. 12 is a top plan view thereof.

DESCRIPTION OF THE PREFERRED EMBODIMENTS

Figure 1:
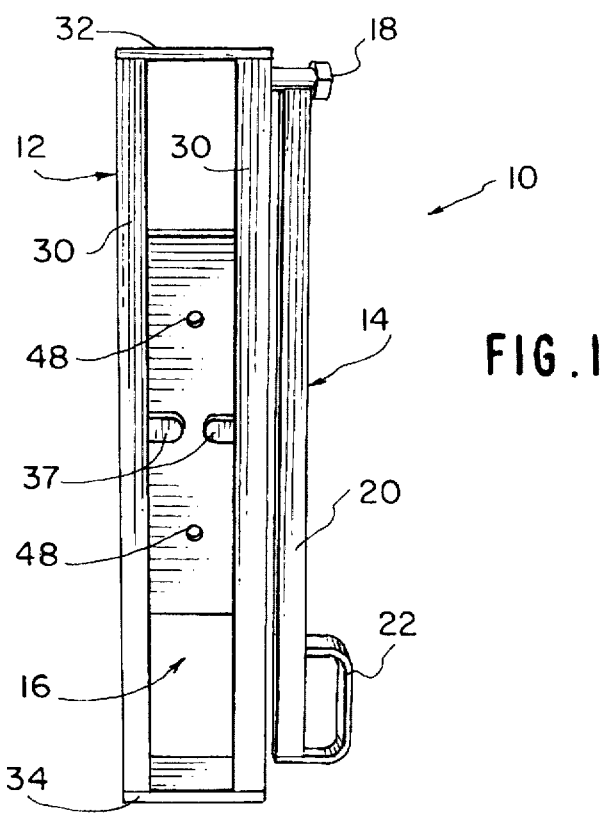
FIG. 1 is a front elevational view of an open frame, self standing bicycle parking module forming a preferred embodiment of the invention and including a pivotable high strength security arm.

Referring to FIGS. 1–10, a preferred embodiment of an open frame, self standing bicycle parking module is indicated generally at 10 and consists of two primary components, an open frame structure indicated generally at 12 and a high strength security arm indicated generally at 14. The open frame structure is elongated vertically, and as will be seen from further reference to FIGS. 3–6, is made up principally by a plurality of upstanding, tubular metal side rails, preferably square in cross-section and preferably of steel, along with a relatively thin, flat top plate 32 and an identical bottom plate 34. The plates are also preferably of steel and in the preferred embodiment, the four upstanding tubular steel side rails 30 are welded at opposite ends to opposing surfaces of the top plate 32 and bottom plate 34, at the four corners thereof. As such, there is formed a front vertical slot 16 extending from the bottom plate 34 to the top plate 32. Pivotably mounted to one side of the open frame structure 12 is the high strength security arm 14 formed principally by one inch by one inch square steel tubing 20 with one eighth inch wall and having welded at an upper end thereof a hex head bolt or threaded stud 18 which threads into a tapped hole 44 of a hex nut 42, which is welded to an inside face of a side rail 30 and the underside of top plate 32, FIG. 5. The free end of the rotatable or swinging security arm 14 has a U-shaped handle 22 fixed thereto, formed of a flat steel bar of several inches in length bent at right angles at opposite ends, with one end flush with the side of the square tubing 20 and the other end elongated and underlying the free end of the swinging security arm tubing 20, with both ends welded to that tubing. When not in use, the arm automatically pivots downwardly, parallel to the open frame structure 12 and to the side of the same. The length of the square tubing 20 is slightly less than the distance between the top and bottom plates 32, 34.

In use, the embodiment of the invention as shown in FIG. 1 is employed to support and secure a bicycle indicated generally at B by way of its front wheel W, composed principally of a rim R and a pneumatic tire T, both of which are sized so as to fit within slot S as defined by the front side rails 30 spaced laterally and forming the front to rear slot S. The steel security arm 14 is rotated to a slightly oblique position from horizontal as per FIG. 2, with the handle 22 constituting a strong steel loop positioned adjacent the tire to the rear of that portion projecting within slot S. In this position, the bicycle may be secured to the bicycle parking module 10 readily by means of a conventional U-lock indicated generally at 24, consisting of a transverse bar 26 and a U-member 28 which locks thereto as at 28A, with the interior of the U-lock capturing a portion of the bicycle frame F and wheel W, as well as passing through the strong steel loop or handle 22 at the free end of the security arm 14. As such, bicycles B may be parked and secured either by the front wheel and frame, or by the rear wheel (not shown) and frame F. The open frame structure which is aesthetically pleasing, strong and highly rigid may be appreciated by further viewing FIGS. 1–6. In the example shown, the open frame, self standing bicycle parking module 10 is approximately two feet in height, formed by four square steel tubing pieces 30, which are nearly two feet in length and which are welded at their opposite ends to opposing faces of the top plate 32 and bottom plate 34 at respective four corners as clearly seen in the drawing figures. To ensure rigidity and to create a slot effect for the wheel, preferably a pair of horizontal reinforcing bars 36 of the same tubing which forms the vertical side rails 30 are welded between opposing faces of front to rear vertical side rails to the left and right, FIG. 3. These pieces of square tubular steel may be three inches in length. The lateral width of the nearly square top to bottom parallelepiped structure is 4.5 inches in the example shown, while the front to rear depth is 5.0 inches. The steel plates are approximately 0.20 inch in thickness. The top plate 32 is provided with a circular hole 38 of small diameter at its center and a similar sized hole 40 is formed within the center of the bottom plate 34. This permits the bottom plate to act as a base for the freestanding structure and to be fixedly secured to an underlying planar support member or surface (not shown). The hole 38 within the top plate may function to permit coupling by way of screws, nuts and bolts or like fasteners to an overlying member supported thereon as will be described hereinafter. Full welds W are employed for welding a hexagonal nut 42 to an inside surface of one of the two front side rails 30 immediately below the top plate 32, FIG. 5 and to the top plate itself. The tapped bore 44 acts to receive the threaded shank 52 of bolt 18 as illustrated in FIG. 9. To further reinforce the open frame structure 12 and to provide a wheel stop when the structure is free standing, there is provided a relatively long back plate 46 which is welded along opposite sides to confronting faces of the rear set of side rails 30, FIG. 6. The back plate, also formed of steel, permits by way of a pair of aligned holes 48 near the top and bottom edges of the back plate, fasteners such as screws or bolts for mounting of the open frame structure 12 to a vertical wall or the like (not shown) which may be in lieu of or in conjunction with the mounting of the bottom plate to an underlying planar support member (not shown). The security arm 14, FIGS. 9, 10, may be mounted to the open frame structure 12 by threading shank 52 of bolt 50 into the tapped bore 44 of the nut 42, FIG. 5. By simply rotating the bolt 50 about its axis by swinging tubing 20 in a circle, the arm is rotatably attached to the open frame structure behind a front side rail 30 with a face of the nut 42 flush with the outside of that side rail. Also the bore 44 of the nut 42 should be sufficiently large to allow easy attachment of a self-coiling cable in place of the security arm, if such is desired. Such self-coiling cable is attached by running one end through the bore 44 of the nut and clamping it back on itself with a conventional cable fitting.

Figure 2:
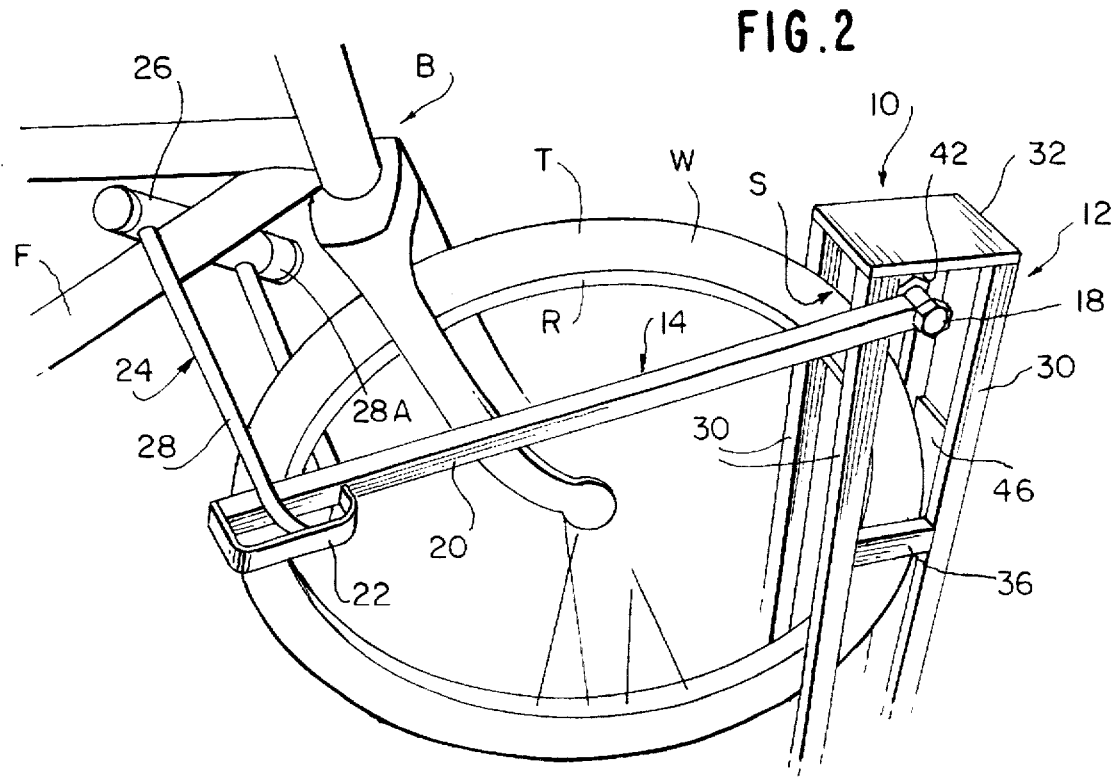
FIG. 2 is a perspective view of the bicycle parking module of FIG. 1, with a front wheel of a bicycle inserted within a front slot of the module, and the security arm coupled to the bicycle frame via a conventional U-lock.

The security arm 14 pivots out from its normal vertically oriented position far enough to allow a U-lock 24, FIG. 2, to be secured over the bike frame and through the wheel. When the pivotable steel security arm 14 is installed by rotating it about the bolt 50 axis until it is properly screwed in place, the arm is free to pivot or rotate 360°. When the rack is installed next to a wall, under a bench, seat or with a coupling bracket, the steel security arm can no longer be rotated to an extent of 360° and thus cannot be removed from the bicycle parking module 10. When a module is mounted to a narrow object like a sign post, the bumper bolt prevents 360° rotation.

In the illustrated embodiments, the access to the front slot S is limited by the inclusion of a pair of oppositely directed, coplanar durable Norprene™, a rubber-like thermoplastic, fingers 37 which in the illustrated embodiment of FIGS. 3 and 6 are mounted on the tops of the cross bars 36 immediately behind the front vertical rails, projected at right angles thereto but terminate short of each other. These members are flexible and resilient and will flex inwardly and outwardly depending upon the direction of movement of the bicycle wheel W, FIG. 2, during entry and removal from the slot S within the open frame structure 12. Of course, similar elements acting as restraints may vary from the durable rubber fingers 37. It should be noted that the bicycle wheel W is not frictionally held, but rather the fingers snap into their original in-line position after passage of the bicycle wheel W, tire T and rim R. Where the modules 10 are mounted against a vertical wall, they protrude outwardly of the wall only the several (five) inches defined by the front to rear dimensions of the rectangular top and bottom plates 32, 34. The tough rubber fingers 37 flex into place behind the wheel rim and hold the bicycle from rolling back. The four vertical steel side rails 30 and the two horizontal side rails 36 prevent tipping of the bicycle. Thus, bicycles do not fall over or scratch as they often do in conventional bike racks with only two vertical rails. A little pull in the direction of slot S is all that is required to remove a bicycle B wheel from the module 10. The module 10 in the illustrated embodiment is provided with vertical slots of some five inches in depth, but should be at least three inches deep to accommodate the tire and wheel rim and to permit rubber fingers 37 to relax into their normal position of axial alignment. Further, the slots should be sufficiently wide and of a sufficient height to accept all bicycle wheels in common use. The applicant has determined that a slot of plus or minus 2.5 inches wide by 5.0 inches deep by 24 inches high is best.

While the module is described as being formed of steel components which are welded to each other, the module may be made of any rigid or semi-rigid material such as aluminum, fiberglass, plastic, concrete, wood, etc. While the module 10 is described in FIGS. 1–10 as being a freestanding unit, it may be readily attached to another object such as a vertical post, vertical wall and may be grouped with or attached directly to one or more modules or built as an integral part of a load bearing structure, i.e., slot in a wall, post, etc. Molded or stamped steel modules could have solid or semi-solid sides and backs for extra strength and ease of manufacture. The module preferably includes resilient members such as the rubber fingers 37 near the front of the slot S where a bicycle wheel W enters and which may create friction against the wheel during entry and snap back in place behind the rim to keep the wheel and bicycle from unintentionally rolling back out of the slot. These members may be formed of material other than rubber such as plastic, spring steel, fiber brush material, etc. While the slot is shown as being of the same thickness from front to rear, the slot may narrow towards the rear so that a wheel forced into the slot wedges into place at the back of the slot. Means are provided for attaching the otherwise freestanding module 10 to other objects via the sides, back, top and bottom of the open frame module or structure.

The bicycle parking modules 10 may consist solely of the open frame structure 12 with or without the resilient fingers 37 and with or without the rotatable high strength security arm 14. Further, a plurality of such open frame, self standing bicycle parking modules may be used to support seats, benches, planters or like members which span across the top plates of the modules, or the modules can be an integral part of other street furnishings. As such, the modules 10 can be joined by standardized or other brackets to form tree protectors, linear multiple bike parking racks, freestanding racks of regular and irregular form, back-to-back clusters of dual modules and clusters around post columns and trees in polygonal and circular configurations.

An embodiment of a multipurpose bench style bicycle parking rack is illustrated in FIGS. 11 and 12, consisting of ten vertically upright bicycle parking modules 10 supporting an overlying planar seat 56, with four of the modules at respective corners and with additional modules 12 spaced some distance therefrom and along both sides and opposite ends and centered therebetween. In this case, fasteners such screws or bolts pass through the holes 38 within the top plates 32 of the respective modules 10.

Figure 13:
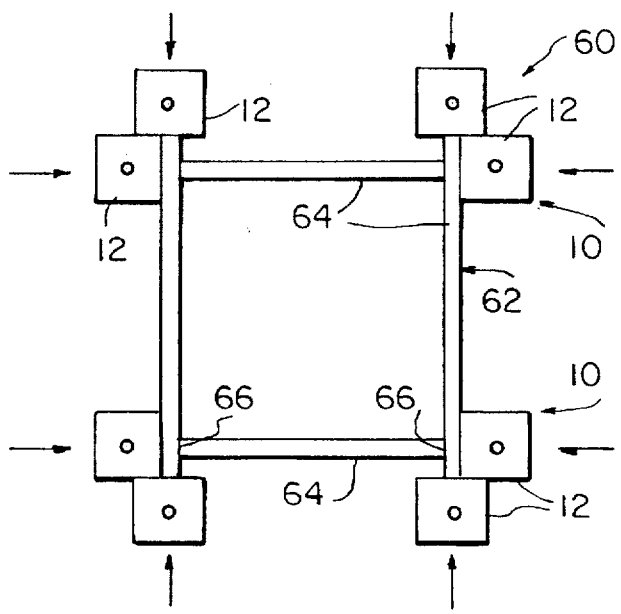
FIG. 13 is a top plan view of a rectangular open frame type, multi-module bicycle rack forming a further embodiment of the invention.

FIG. 13 illustrates a further embodiment of the invention in the form of a tree protection arrangement or formation of a plurality of the bicycle parking modules 10, in this case bolted near the four corners of a square open frame 12 formed by a pair of opposite, parallel, short length square steel tubes 64 bolted at opposite ends to opposing faces of somewhat longer square steel tubes 62 at contacting points 66. At each of the four corners, two of the bicycle parking modules 10 are in turn bolted to the respective sides and ends of the longer length square steel tubes 62, making the assembly very rigid and strong without welding. This allows disassembly by authorized personnel. The modules may be attached by bolts through rear plate mounting holes, with those bolts being threaded into inserts in the end of the square tubes 66. The bolts pass through tubes 62 and into the threaded ends of tube 64. The bolts allow disassembly and easy storage. Tamper-proof bolts may be used. The direction of parking is indicated by arrows for the respective open frame structures 12 of the various modules 10. Welding may be the alternative means for coupling modules together.

Figure 14:
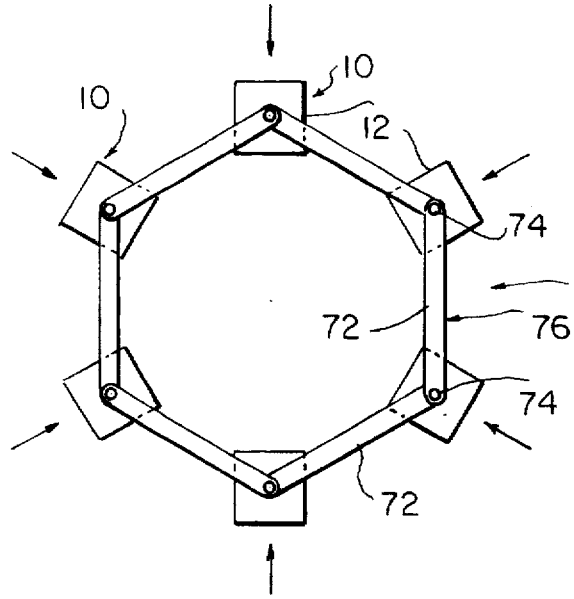
FIG. 14 is a top plan view of a bicycle parking rack formed of a plurality of open frame, self standing bicycle parking modules constituting a tree protection assembly of hexagonal plan form forming a further embodiment of the invention.

Referring next to FIG. 14, the open frame structures 12 of a cluster frame indicated generally at 76 form a hexagonal configuration permitting six bikes about a tree (not shown but centered within the open frame structure 76). That cluster frame is created by joining heavy flat connector bars 72 at the top and bottom plates of the modules 10, with the connector bars overlapping and underlapping each other appropriately and being fastened to the top and bottom plates of the modules by tamper resistant bolts and nuts as at 74. In this construction, bottom connectors are not required if the modules are anchored to the ground or to a underlying rigid support. The directions of parking are indicated by the arrows, with the open slots of the open frame structures 12 facing radially outwardly of the looped array. It should be noted that a dummy bar may be substituted for any bicycle parking module 10 if parking in all positions is not desirable. Such is simply a square tube with threaded ends bolted in place of the missing module 10.

Figure 15:
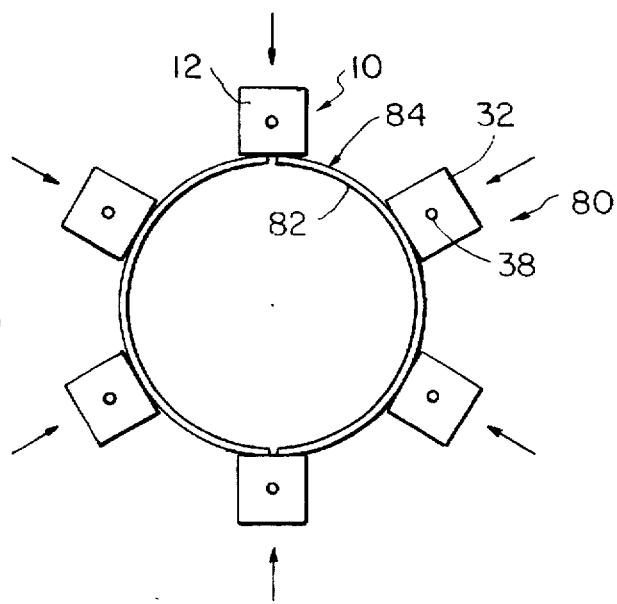
FIG. 15 is a top plan view of a circular multi-module bicycle rack forming a further embodiment of the invention and constituting a circular tree protection structure.

Referring to FIG. 15, that figure illustrates a tree protection formation or assembly for bicycle parking about all sides of the tree centered within a circular structure defined by a pair of semi-circular hoops 82 forming with the modules 10 circumferentially spaced around the hoops a multiple module bicycle parking rack 80. The semi-circular hoop sections are joined at the location of diametrically opposite parking modules 10. The modules 10 have their open front slots facing radially outwardly as indicated by the arrows, portraying the direction of parking of six bicycles circumferentially spaced by 60°. Preferably, the cluster frame indicated generally at 84 defined by two semi-circular sections 82 is comprised of two upper and two lower steel half hoops to which the parking modules are bolted through their rear plates 46. The hoops may be joined by clips which are drawn into place by bolts which anchor the modules to the frame. One or more of the modules 10 may be anchored to the ground via the holes in the bottom plates of the open frame structures 12. If the multi-module bicycle rack 80 is not employed as a structural tree protection assembly, a circular seat or planter may be attached to the multiple modules 10 via the circular holes 38 within the top plates 32 of these unitary structures.

The pivoting security arm has application to bicycle racks including structural components defining a frontal vertical slot and having means for pivoting the end of the security arm to the side of that structure for movement into an inclined position away from the front of the slot to permit locking to a component of the bicycle such as the bicycle frame. Such pivoting security arm therefore has application to existing schoolyard style racks or building structures defining slots receiving either the front or rear wheel of the bicycle. It is also advantageous that the embodiment of the invention described in detail herein and illustrated may be modified to accept motorcycles or other vehicles similar to bicycles having larger slot dimensions to accept wider tires and tire accepting rims. Thus, the simplified rack of this invention may be optimized for vehicles ranging from unicycles to motorcycles by scaling the rack or open frame structure to the wheel size.

Many changes in the construction and form of the bicycle parking module or multi-modular unit bicycling rack may be made without departing from the spirit and scope of the invention. The disclosures and the descriptions herein are purely illustrative and are not intended to be in any sense limited other than to the claims.

I claim:

1. An open frame, self standing bicycle parking module comprising:

opposed, identical, flat rectangular, horizontal top and bottom plates, upstanding vertical side rails interposed between said horizontal top and bottom plates, at respective corners thereof, and fixed at opposite ends to facing surfaces of said horizontal top and bottom plates and forming a parallelepiped, unitary, rigid, open frame structure defining an open front slot sized to receive a bicycle wheel rim and tire, and resilient means mounted to said open frame structure adjacent said open front slot and spanning across said slot and being deflectable to permit passage of the wheel and rim and for positioning behind the rim to maintain the bicycle wheel within the front open slot.

2. The open frame bicycle parking module as claimed in claim 1, further comprising a rear plate fixedly mounted to and spanning between a pair of opposed sidewalls remote from said open front slot and at least one aperture in said rear plate for facilitating mounting of said bicycle parking module to a vertical support surface by means of a fitting passing through said at least one aperture.

3. The open frame bicycle parking module as claimed in claim 1, further comprising horizontal reinforcing bars or side plates fixedly mounted between aligned front and rear upstanding side rails to each side of said structure to create a slot effect for the wheel for rendering said open frame bicycle parking module rigid and for strengthening same.

4. The open frame bicycle parking module as claimed in claim 1, further comprising at least one aperture within each of said bottom plate and said top plate for facilitating fixedly mounting of said bottom plate to an underlying planar support member by a fastener passing through said at least one aperture thereof and for facilitating mounting of the top plate to an overlying planar member by a similar fastener through said at least one aperture thereof.

5. The open frame bicycle parking module as claimed in claim 1, further comprising a threaded nut fixedly mounted to said open frame proximate to said top plate and opening laterally outwardly of said open frame structure, an elongated security arm having a threaded bolt or stud mounted to one end thereof and a threaded shank projecting laterally outwardly from said security arm, a closed loop formed on the end of said security arm remote from said bolt and to a side opposite said shank of said bolt, and wherein the shank of said bolt or stud is threaded into said nut such that said security arm pivots about a common axis of said bolt and nut, such that normally, the security arm hangs downwardly along the exterior of said bicycle parking module open frame structure and may be rotated into a position such that the closed loop moves away from the open frame structure proximate to the wheel rim and tire remote from said front vertical slot, permitting a U-lock to pass therethrough and to facilitate locking of said closed loop to a frame of said bicycle.

6. The open frame bicycle parking module as claimed in claim 1, wherein said side rails are of rectangular cross section, said side rails and said opposed rectangular top and bottom plates are formed of steel, and the opposite ends of said side rails are welded to opposed faces of said rectangular top and bottom steel plates.

7. A multiple module bicycle rack comprising:
a plurality of upstanding, open frame, self standing bicycle parking modules, each parking module comprising:
opposed identical, flat, rectangular, horizontal top and bottom plates, upstanding side, vertical rails at respective corners fixed at opposite ends to facing surfaces of said top and bottom plates and forming a parallelepiped, unitary, rigid, open frame structure defining an open front slot sized to receive a bicycle wheel rim and tire, an elongated transverse common coupling member overlying said top plates and being rigidly coupled thereto and forming a longitudinally spaced array of bicycle parking modules as a freestanding structure.

8. The multiple module bicycle rack as claimed in claim 7, wherein said bicycle parking modules are fixed to the periphery of said transverse common coupling member.

9. The multiple module bicycle rack as claimed in claim 7, wherein said transverse common coupling member comprises a planar bench.

10. The multiple module bicycle rack as claimed in claim 7, wherein said transverse common coupling member comprises a planar seat.

11. The multiple module bicycle rack as claimed in claim 7, wherein said transverse common coupling member comprises a table top.

12. The multiple module bicycle rack as claimed in claim 7, wherein said transverse common coupling member comprises an upwardly open box like planter.

13. A tree protection multiple module bicycle parking rack comprising:
a rectangular, open frame assembly of end-to-end abutting steel tubes forming a rigid rectangle, at least one open frame, self standing bicycle parking module at respective corners of said open frame steel tube assembly, each bicycle parking module comprising opposed identical, flat, rectangular, horizontal top and bottom plates, upstanding vertical side rails at respective corners fixed at opposite ends to facing surfaces of said top and bottom plates and forming a parallelepiped, unitary rigid open frame structure defining an open front slot sized to receive a bicycle wheel rim and tire, resilient members mounted to opposite side rails and spanning across said open front slot and deflectable to permit the wheel rim and tire to pass therethrough and to snap back behind said rim upon passage of the bicycle wheel rim and tire into said slot, with said front open slots of said bicycle parking modules facing away from said rectangular metal tube frame structure.

14. The multiple module bicycle rack as claimed in claim 13, wherein a pair of said bicycle parking modules are fixedly mounted to said rectangular open frame structure at each of said four corners, with said open front slots of said adjacent bicycle parking modules at each of said corners facing outwardly at 90° and away from each other.

15. A multi-module bicycle parking rack comprising:
a plurality of bicycle parking modules, each bicycle parking module comprising opposed, identical, flat, rectangular, horizontal top and bottom plates, upstanding, vertical side rails at respective corners fixed at opposite ends to facing surfaces of said top and bottom plates at respective corners thereof and forming a parallelepiped, unitary, rigid, open frame structure defining an open front slot sized to receive a bicycle wheel rim and tire, a cluster frame constituted by connector bars extending across at least one of the tops and bottoms of all of said modules and being coupled together at opposite ends to respective ones of said top and bottom plates of said modules, said cluster frame being of polygonal form and creating a rigid assembly, and wherein the open front slots of respective modules face away from a center of the cluster frame to permit parking of bicycles in a circumferential array about the exterior of said cluster frame.

16. A multi-module bicycle parking rack comprising:
a plurality of open frame self standing bicycle parking modules, each bicycle parking module comprising opposed, identical, flat, rectangular, horizontal top and bottom plates, vertical side rails fixed at opposite ends to facing surfaces of said top and bottom plates at respective corners thereof and forming a parallelepiped, unitary, rigid, open frame structure defining an open front slot sized to receive a bicycle wheel rim and tire, resilient means carried by laterally opposed side rails defining said open front slot permitting deflection during passage of a bicycle rim and tire through said slot and snapping across the bicycle wheel rim upon passage therethrough to maintain the bicycle wheel rim and tire within said slot, a cluster frame formed of at least two upper and lower steel half hoops fixedly mounted to rear sides of said parking modules, with two of said modules coupling said half hoops together to form a full hoop circular structure about a tree centered interiorly of said hoop, and wherein said bicycle parking modules have their open front slots facing away from axes of said hoops and being circumferentially spaced about the periphery of the hoops such that bicycles parking at said plural bicycle parking modules fan outwardly away from said cluster frame and are spaced at circumferential positions from each other.

17. A rotating security arm for rotatable mounting to a side of a bicycle rack including a pair of laterally spaced side members defining an open front slot sized to receive a bicycle wheel rim and tire therein, a tapped hole within a side member of said bicycle rack at right angles to the plane of said open front slot, said security arm comprising an elongated rigid member having opposed ends, a head bolt or threaded stud fixed to one end of said elongated rigid member and having a threaded shank projecting to one side thereof at right angles thereto, a loop fixedly mounted to the end of said rigid member opposite said bolt such that said security arm is rotatably mounted to said bicycle rack, with said elongated member suspended downwardly from said tapped hole and rotatable in a position such that said loop is remote from the bicycle wheel rim and tire projecting within said open front slot, thereby permitting locking of said loop via a U-lock to a frame and wheel of said bicycle remote from said slot.

18. The rotatable security arm as claimed in claim 17, wherein said loop comprises a flat bar of steel bent into U-shape and having respective opposite ends fixed to said elongated rigid member at the bottom of said elongated rigid member remote from said head bolt and a side of said elongated rigid member remote from said one end.

* * * * *